United States Patent
Jarema et al.

(12) 
(10) Patent No.: US 6,191,201 B1
(45) Date of Patent: Feb. 20, 2001

(54) BAKING OVEN INTERIOR COATING AND PROCESS THEREFOR

(75) Inventors: Chester P. Jarema, Sterling Heights; Michael A. Stuart, Davison, both of MI (US)

(73) Assignee: Henkel Corporation, Gulph Mills, PA (US)

( * ) Notice: Under 35 U.S.C. 154(b), the term of this patent shall be extended for 0 days.

(21) Appl. No.: 09/051,855

(22) PCT Filed: Oct. 15, 1996

(86) PCT No.: PCT/US96/16128

§ 371 Date: Apr. 20, 1998

§ 102(e) Date: Apr. 20, 1998

(87) PCT Pub. No.: WO97/14745

PCT Pub. Date: Apr. 24, 1997

(51) Int. Cl.⁷ .............................. C08K 5/01; C08K 5/13; C08K 5/36; B32B 15/08; B32B 27/00

(52) U.S. Cl. .................. 524/302; 524/304; 524/342; 524/474; 428/461; 428/462; 126/273 R

(58) Field of Search .............. 126/273 R; 428/461, 428/462; 524/302, 304, 342, 474

(56) References Cited

U.S. PATENT DOCUMENTS 3,907,517 * 9/1975 Minagawa et al. .................. 252/401
4,411,954 * 10/1983 Butch, III et al. .................. 428/343

* cited by examiner

*Primary Examiner*—Kriellion Sanders
(74) *Attorney, Agent, or Firm*—Wayne C. Jaeschke; Stephen D. Harper; Norvell E. Wisdom, Jr.

(57) ABSTRACT

A mixture of two stabilizers, one including benzene rings bearing hydroxyl substituents and the other containing divalent sulfur atoms, is effective in stabilizing tacky polymers that remain solid up to a temperature of at least 160° C. particularly polymers of isobutylene, so that the polymers give long service in the ambient atmosphere as protective layers coated on aluminum substrates and used to line the interiors of paint baking ovens. When accumulated foreign materials accumulate on the coatings, the coating and the accumulated foreign materials can be decomposed to largely volatile products by heating to a temperature substantially higher than the service temperature but not high enough to melt the metal substrate for the coating.

20 Claims, No Drawings

BAKING OVEN INTERIOR COATING AND PROCESS THEREFOR

BACKGROUND OF THE INVENTION

1. Field of the Invention

This invention relates to an improved material for the interior surface of baking ovens used at moderately high temperatures and to a liquid composition and a process for using this liquid composition to produce the improved interior surface material.

2. Discussion of Related Art

Baking ovens are necessary for practical utilization of many currently commercial high quality protective coatings, which are applied in liquid form and ultimately baked for at least several minutes and often much longer in order to reach their finally desired degree of chemical reaction, so that the protective value of the coatings is maximized. Most such coatings produce gaseous emissions during the baking process, and such emitted materials can react with themselves and/or the walls of the baking oven to form a coating on these walls. In many cases the coatings thus formed eventually accumulate to a sufficient thickness to consume an undue amount of the expensively heated space within the oven, and/or the oven wall coatings themselves emit products on further heating that can damage the cleanliness and other quality features of the protective coatings on other objects that are being cured in the baking ovens.

Accordingly, it would be advantageous to provide oven interior surfaces with a protective covering that reduces the accumulation of unwanted additional solid coatings thereon and/or can readily and cheaply be removed when the accumulations on it become troublesome in any respect. However, fully suitable materials for such a protective covering for oven interior walls have previously been unavailable, particularly when the ovens to be protected are used for extended periods at temperatures as high as 160° C.

DESCRIPTION OF THE INVENTION

Objects of the Invention

A major object of the invention is to provide an improved oven interior surfacing material that will provide satisfactory service under usage conditions as described above. Another concurrent or alternative object is to provide a liquid composition that can conveniently be coated onto a metal backing and then converted by a practical process into an improved oven interior surfacing material. Still another concurrent or alternative objective is to provide an interior surfacing material with tack, so that particulate matter will have a greater tendency to adhere to it rather than remaining in suspension in the gaseous atmosphere within the oven, where it would be more likely to blemish the surface of some object being baked in the oven. Other objects will be apparent from the description below.

General Principles of Description

Except in the claims and the specific examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred, however. Also, unless expressly stated to the contrary: percent, "parts of", and ratio values are by weight; the term "polymer" includes "oligomer", "co- polymer", "terpolymer", and the like; the first definition or description of the meaning of a word, phrase, acronym, abbreviation or the like applies to all subsequent uses of the same word, phrase, acronym, abbreviation or the like and applies, *mutatis mutandis*, to normal grammatical variations thereof, the description of a group or class of materials as suitable or preferred for a given purpose in connection with the invention implies that mixtures of any two or more of the members of the group or class are equally suitable or preferred; specification of materials in ionic form implies the presence of sufficient counterions to produce electrical neutrality for the composition as a whole; and any counterions thus implicitly specified preferably are selected from among other constituents explicitly specified in ionic form, to the extent possible; otherwise such counterions may be freely selected, except for avoiding counterions that act adversely to the objects of the invention.

SUMMARY OF THE INVENTION

It has been discovered that metal substrates having surfaces that contain at least 45% of aluminum can be coated with a combination of tacky solid and two types of antioxidants in solvent and then converted to a solid coating by expelling most of the solvent by heating, to produce an excellent surfacing material for the interior of baking ovens. The outer "coated" side of this surfacing material, which faces the interior space within the oven when in use, remains tacky for at least a few days, even when aged at temperatures in excess of 160° C. When excessive undesirable deposits accumulate on this coated side of the surfacing material, the coating layer can easily be removed by heating to a higher temperature such as 275° C. in the presence of oxygen, such as in the ambient natural atmosphere. The covering then decomposes cleanly, along with most organic residues accumulated on it, and any non-combustible constituent(s) of the accumulated residues can easily be removed from the oven. The interior walls of the oven can then be recoated with a liquid composition according to the invention and heated at an appropriate temperature to convert the liquid coating thus formed to a solid protective coating, so that the oven is ready for continued use.

One embodiment of the invention is accordingly a suitable liquid coating composition which comprises, preferably consists essentially of, or more preferably consists of:

(A) a component of polymeric material that (i) is solid and (ii) has tack sufficient to be sensed by a brief touch by a normal human finger, both throughout a temperature range from 25 to 160° C.;

(B) a first stabilizing component selected from the group consisting of molecules and moieties[1] thereof, exclusive of molecules and moieties thereof that constitute component

---

[1] Ordinarily, each of components (B) and (C) preferably is selected from individual and distinct molecules containing the chemical features recited for each component. However, all of the chemical features required for both the first and second stabilizing components could be incorporated into a single molecule and/or could be grafted onto polymer molecules that are part of component (A). The phrase "moieties thereof" in the description of components (B) and (C) is intended to embrace these possibilities. However, if an entire molecule present in a composition according to the invention includes all the chemical features required for component (B) or (C) and does not include all the chemical features required to constitute part of any other of components (A) through (C), the entire molecule rather than any moiety thereof is to be considered as part of the component (B) or (C) of which it can constitute a part. On the other hand, if a molecule present in a composition according to the invention includes both all the chemical features required to constitute a part of component (B) or (C) and also all the chemical features required to constitute a part of at least one other of components (A) through (C), only any smallest continuously bonded moiety of such a molecule that contains all the necessary features recited for component (B) is to be considered part of component (B) and only any smallest continuously bonded moiety of such a molecule ponet (A), each of the first stabilizing component molecules or moieties thereof containing (i) at least one benzene ring that is substituted with at least one hydroxyl moiety and at least two alkyl moieties and (ii) at least one carbon atom bonded by single bonds to four other carbon atoms, alternatively called a "tertiary" carbon atom;

(C) a second stabilizing component selected from the group consisting of molecules or moieties thereof, exclusive of molecules or moieties thereof that constitute component (A) or (B), each of said molecules or moieties thereof containing (i) at least one divalent sulfur atom that is bonded to two distinct carbon atoms and (ii) at least two carboxyl or carboxylate moieties; and (D) a component of solvent, exclusive of materials that constitute part of any of the preceding components, the solvent having a freezing point below 20° C. and a boiling range at a pressure of 1 bar that begins at a temperature that is at least about 70° C. and ends at a temperature that is not more than 230° C. and being present in sufficient amount to dissolve together into a single solution all of components (A), (B), and (C) to form a solution that is liquid at 25° C.; and, optionally, (E) a continuous liquid phase, preferably water, into which the solution formed by components (A) through (D) above is emulsified but remains as a separate phase, that also includes all the preferred features of a preferred embodiment of component (B) is to be considered part of a particular preferred embodiment of component (B), and if the remainder of that molecule contains all the chemical features necessary to constitute a part of component (C), that remainder constitutes part of component (C), unless the remainder also includes all the chemical features required to constitute component (A), in which instances only any smallest continuously bonded moiety of such remainder that contains all the necessary and/or preferred features recited for component (C) is to be considered part of component (C), and the residue is to be considered part of component (A). If a molecule present in a composition according to the invention does not contain all the chemical features required for component (B) but does contain all the chemical features required to constitute both components (A) and (C), only any smallest continuously bonded moiety of such a molecule that contains all the necessary features recited for component (C) is to be considered part of component (C) and only any smallest continuously bonded moiety of such a molecule that also includes all the preferred features of a preferred embodiment of component (C) is to be considered part of a particular preferred embodiment of component (C), and the remainder of the molecule is to be considered part of component (A). said liquid coating composition having the property that, when a volume of the composition is formed into a layer not more than 0.5 millimeter in thickness and heated to at least one temperature not greater than 160° C., in a space containing gas having a pressure no higher than that of the ambient natural atmosphere, at least components (A), (B), and (C) of the composition will be converted within a time of 60 minutes into a coherent tacky solid and at least a preponderant part of components (D) and (E) will be volatilized.

Another embodiment of the invention is a process comprising, preferably consisting essentially of, or more preferably consisting of, the steps of:

(I) providing (i) a metallic substrate having at least one surface constituted of not less than 45% of aluminum and (ii) a liquid composition according to the invention as described above;

(II) forming at least part of the liquid composition provided in step (I) into a liquid coating over at least part of the surface constituted of not less than 45% of aluminum on the substrate also provided in step (I); and (III) heating the liquid coating formed in step (II), while said coating is in place over the substrate surface as formed in step (II), for a sufficient time at a sufficient temperature to convert it to a solid, adherent, and tacky coating over those portions of the substrate surface that were provided with a liquid coating in step (II).

Other embodiments of the invention include coated metal substrates prepared by a process according to the invention as described above, the use of such coated metal substrates to line pre-existing oven interiors, a process of installing such linings in either new or pre-existing ovens, ovens with interior surfaces of coated metal substrates prepared by a process according to the invention, and the like.

DETAILED DESCRIPTION OF THE INVENTION, INCLUDING PREFERRED EMBODIMENTS

Component (A) is preferably selected from hydrocarbon polymers, and more preferably is selected from aliphatic hydrocarbon polymers in which the number of residual carbon-carbon double bonds in the polymer molecules is no greater than, with increasing preference in the order given, 0.3, 01.0, 0.050, 0.030, 0.020, 0.010, 0.0080, 0.0060, 0.0040, or 0.0030 times the number of carbon atoms in the molecules. Most preferably, the polymers for component (A) are homopolymers of isobutylene or copolymers of isobutylene and 1,3-butadiene. Independently of the other preferences, the Flory, alternatively called the Viscosity Average, molecular weight of the polymers from which component (A) is selected is at least, with increasing preference in the order given, $1.0 \times 10^4$, $2.0 \times 10^4$, $3.0 \times 10^4$, $3.5 \times 10^4$, $4.0 \times 10^4$, $4.5 \times 10^4$, or $5.0 \times 10^4$ and independently preferably is not greater than $1.1 \times 10^6$.

In general, the concentration of component (A) in a coating composition according to the invention appears to make little difference in the technical quality of the results achieved. However, for reasons of economy, it is preferable to make the concentration of component (A) as high as practical, with the upper limit usually being set by solubility of the polymer in the available solvent and/or the unworkably high viscosity of a more concentrated solution. Typical practically preferred values are shown in the working examples below. If arrangements are made to recover and reuse the solvent expelled from the liquid coatings after they are in place on the substrate to be coated in a process according to the invention, economic preferences may shift to more dilute concentrations of component (A), which have lower viscosities and therefore allow more choices of method of application to the substrate.

First stabilizing component (B) is preferably selected from molecules in which all benzene rings present are substituted with at least two, preferably exactly two, alkyl moieties and at least one, more preferably exactly one, hydroxyl moiety. Independently, any benzene ring present in a molecule or moiety thereof that constitutes component (B) and that has a hydroxyl moiety substituent preferably also has an alkyl moiety substituent on each of both of the two carbon atoms in the benzene ring that are nearest to the carbon atom of the benzene ring that has the hydroxyl moiety substituent. Independently of the other preferences, each of the alkyl substituents on the hydroxy-substituted benzene rings present in a molecule or moiety thereof that constitutes part of component (B) preferably has at least, with increasing preference in the order given, 2, 3, or 4 carbon atoms and independently preferably has, with increasing preference in the order given, not more than 8, 6, 5, or 4 carbon atoms.

Also, independently of the other preferences and of one another, in a molecule or moiety thereof that constitutes part of component (B): (i) Each alkyl moiety substituent on a benzene ring carbon atom adjacent to a hydroxyl substituted carbon atom of said—benzene ring preferably is bonded to said benzene ring via a carbon atom that is bonded by single bonds to at least two, or more preferably at least three, other carbon atoms within the alkyl moiety and (ii) the molecule or moiety thereof that constitutes part of component (B) also contains at least one carboxylate ester moiety through which at least one benzene ring of the molecule or moiety thereof that has a hydroxyl substituent and at least two alkyl substituents is bonded to a tertiary carbon atom in the same molecule or moiety thereof, and more preferably has one such carboxylate ester moiety for each benzene ring of the molecule or moiety thereof that has a hydroxyl substituent and at least two alkyl substituents. The single most preferred compound for component (B) is tetrakis {methylene 3-(3', 5'-ditertiarybutyl-4-hydroxybenzene propionate} methane, which is the tetra-ester of pentaerythritol with 3-(3',5'-ditertiarybutyl-4-hydroxyl phenyl) propionic acid.

Independently of the other preferences and of one another, in each molecule or moiety thereof that constitutes part of component (C): (i) The divalent sulfur atom preferably is bonded to at least one alkylene moiety, more preferably to two alkylene moieties, that is or are also bonded via their other open valence to a carboxyl or carboxylate moiety, and said alkylene moiety or moieties have at least, with increasing preference in the order given, 1, 2, or 3 carbon atoms and independently have not more than, with increasing preference in the order given, 10, 8, 6, 5, 4, or 3 carbon atoms, said alkylene moieties independently preferably being straight chain alkylene moieties; (ii) at least one, and preferably all, of the carboxyl or carboxylate moieties present are ester carboxylate moieties; and (iii) any ester carboxylate moieties present in the molecule or moiety thereof are esters of alcohols, preferably straight chain alcohols, that have at least, with increasing preference in the order given, 6, 8, 10, or 12 carbon atoms per alcohol molecule and independently preferably have not more than, with increasing preference in the order given, 24, 22, 20, or 18 carbon atoms per alcohol molecule. The single most preferred compound for component (C) is lauryl stearyl thiodipropionate.

The concentrations of components (B) and (C) in a coating composition according to the invention are preferably determined by reference to the concentration of component (A) and/or each other, rather than by any absolute value, because of the variable amount of solvent that can be used as already described above. More particularly, in any particular liquid coating composition according to the invention or in a liquid or solid coating formed therefrom by a process according to the invention: (i) The ratio of component (C) to component (B) preferably is at least, with increasing preference in the order given, 0.0:1.0, 0.30:1.0, 0.40:1.0, 0.50:1.0, 0.60:1.0, 0.70:1.0, 0.80:1.0, 0.90:1.0, or 0.95:1.0 and independently preferably is not more than, with increasing preference in the order given, 2.0:1.0, 1.5:1.0, 1.40:1.0, 1.30:1.0, 1.20:1.0, 1.15:1.0, 1.10:1.0, 1.05:1.0, or 1.00:1.0; and, independently, the ratio of component (B) to component (A) preferably is at least, with increasing preference in the order given, 0.0010:1.0, 0.0020:1.0, 0.0040:1.0, 0.0060:1.0, 0.0070:1.0, 0.0080:1.0, 0.0085:1.0, 0.0090:1.0, 0.0093:1.0, 0.0096:1.0, or 0.0098:1.0 and independently preferably is not more than, with increasing preference in the order given, 0.08:1.0, 0.050:1.0, 0.040:1.0, 0.030:1.0, 0.025:1.0, 0.020:1.0, 0.017:1.0, 0.014:1.0, 0.013:1.0, or 0.012:1.0.

In general, solvent component (D) may be chosen primarily for its solvent properties, environmental impact, and cost, because it is expected to have little chemical effect on the solid coating formed, from which at least most of it has been expelled. A paraffinic solvent is normally preferred, and mineral spirits distilled from petroleum is particularly preferred because of its relatively low cost and absence of known adverse environmental impact. Independently of the chemical nature of the solvent, its boiling range at a pressure of 1 bar preferably begins at at least, with increasing preference in the order given, 100, 110, 120, 130, 140, 145, 150, 155, or 158° C. and independently preferably ends at not more than, with increasing preference in the order given, 220, 200, 190, 185, 182, 180, or 178° C.

The substrate surfaces coated in a process according to the invention preferably contain at least, with increasing preference in the order given, 60, 75, 80, 85, 90, or 95% of aluminum. The substrate surface may be and often is a coating over some other material, as in the aluminized steel that is very commonly used in constructing paint baking ovens. However, as shown in the examples and comparison examples below, direct coating over steel or most other metals produces a significantly less long-lived product.

Any method of application, including but not limited to brushing, curtain coating, roll coating, and spraying may be used, with the preference factors for method of application being predominantly economic—no technical performance distinction due to method of application has been noted. The thickness of solid coating produced by a process according to the invention preferably is at least, with increasing preference in the order given, 30, 70, 110, 150, 190, 220, 250, 280, 300, 320, 340, or 350 micrometres (hereinafter usually abbreviated as "$\mu$m") and, primarily for reasons of economy, independently preferably is not more than 1000, 800, 700, 600, 500, 450, or 400 $\mu$m.

The temperature at which the liquid coating formed in a process according to the invention is converted to a solid coating is generally not critical, but preferably should not be so high as to diminish substantially the service life of the coating to be formed. Therefore, when component (A) is a butylene polymer or copolymer as preferred and the conversion from liquid to solid coating takes place in the normal ambient atmosphere, the temperature during this conversion preferably is not greater than, with increasing preference in the order given, 200, 190, 180, or 170° C. and independently, to the extent possible, preferably is, in order to complete the process in a practical time, not more than, with increasing preference in the order given, 50, 40, 30, 20, 15, 10, 5, or 1° C. less than the highest point in the boiling range of the solvent component in the liquid coating formed.

The invention and its benefits may be further appreciated from consideration of the following working examples and comparison examples.

Substrates

The following metal substrates were used and are identified in the tables below by the numbers shown below:
1. Laboratory aluminum foil weighing cups.
2. Cold rolled steel panels.
3. Aluminized steel panels.
4. Solid aluminum alloy panels.
5. Copper panels.
6. Titanium panels.
7. Galvanized steel panels.
8. Hastelloy™ C panels (predominantly nickel).
9. Stainless steel panels
10. Low coefficient of expansion silicate glass.
11. Phosphate conversion coated steel panels.

Tacky Solids

The following tacky solids {component (A) as described above} were used and are identified in the tables by the numbers shown below.
1. VISTANEX® LM-MH low molecular weight polyisobutylene, commercially supplied by Exxon Chemical Co., with the following properties reported by its supplier: penetration distance 15.4 to 11.5 millimeters (hereinafter usually abbreviated as "mm") according to AMS Test Method 210.10; minimum 97.0% non-volatile at 149° C. after 4 hours in a vacuum oven; density of 914 kilograms per cubic meter at 23° C.; Brookfield viscosity of 50,000 to 70,000 centipoises (hereinafter usually abbreviated as "cps") at 177° C.; and Flory molecular weight according to AMS Test Procedure 77-005 of 50,400 to 55,800.

2. VISTANEX® LM-H, which was supplied by the same source as the immediately previous listing and is reported by its supplier to have the same characteristics as VISTANEX® LM-MH except that (i) its penetration distance is 11.4 to 9.5 mm, (ii) its Brookfield viscosity is 80,900 to 68,500 cps, and (iii) its Flory molecular weight is 57,600 to 67,800.

3. VISTANEX® MM L-80, which was supplied by the same source as the immediately preceding listed item and is reported by its supplier to have the same characteristics as VISTANEX® LM-MH except that (i) it has a Flory molecular weight of 0.75 million to 1.05 million, and (ii) no viscosity or penetration values for the pure solids are given by the supplier.

4. EXXON® Butyl Rubber Grade 065 was commercially supplied by Exxon Chemical Co. and was reported by its supplier to be a copolymer of predominantly isobutylene with from 1 to 3 mole percent of 1,3-butadiene and to have a Mooney viscosity of 45±4 on the ML 1+8 (100° C.) scale when tested according to ASTM Test Method D 1646, modified, or ISO Test Method 289.

Stabilizers

The following stabilizers {component (B) or (C) as described above} were used and are identified in the tables by the numbers shown below.

1. IRGANOX® 1010 antioxidant, commercially supplied by Ciba-Geigy Corp and reported by its supplier to be tetrakis {methylene 3-(3',5'-ditertiarybutyl-4-hydroxyphenyl propionate} methane.

2. ETHANOX® 398 antioxidant, commercially supplied by Ethyl Corporation and reported by its supplier to be 2,2'-ethylidene-bis-(4,6-ditertiarybutylphenyl fluorophosphite.

3. ETHANOX® 330 antioxidant, commercially supplied by Ethyl Corporation and reported by its supplier to be 1,3,5-trimethyl-2,4,6-tris-(3,5-ditertiarybutyl-4-hydroxy) benzene.

4. CYANOX™ 1212 antioxidant, commercially supplied by American Cyanamid Corp. and reported by its supplier to be lauryl stearyl thiodipropionate.

5. CYANOX™ LTDP antioxidant, commercially supplied by American Cyanamid Corp. and reported by its supplier to be dilaurylthiodipropionate.

6. 2,6-ditertiarybutyl4-methyl phenol, commonly known in the art as "BHT".

Solvents

The following solvents {component (D) as described above} were used and are identified in the tables by the numbers shown below.

1. Mineral spirits, commercially supplied as SHELLSOL™ 340 HT by Shell Chemical Co. and reported by its supplier to have the following characteristics: a specific gravity at 16° C. of 0.773; 100% total saturated hydrocarbons; <0.1% total aromatics; and distillation with initial boiling point of 159° C., 10% distilled at 161° C., 50% distilled at 163° C., 90% distilled at 169° C., and completely distilled at 177° C.

2. D-Limonene

Coating compositions as shown in Table 1 below were prepared from these components. The stabilizers, which are supplied as solid powders, are not rapidly soluble at normal ambient temperature in the mineral spirits solvent predominantly used. Therefore, where indicated in Table 1 these stabilizers were dissolved separately in a minimal amount of hot acetone and added to the mixture in the resulting solution; the amount of acetone required was never more than 1% of the amount of primary solvent used and is not believed to have had any significant effect on the results obtained. However, it was later learned that the stabilizers could be dissolved without using any auxiliary solvent by raising the temperature of the primary solvents, and this method was used in later operations.

The tacky and/or rubbery polymeric materials used were cut into small pieces to facilitate dissolution and, in all the examples shown in Table 1 dissolved adequately after stirring for no more than a few hours at temperatures up to 90° C. In some other tests not shown, attempted dissolution was not practical and the corresponding compositions were not tested further.

The liquid compositions were applied to the substrates tested by brushing, immersion, or spraying until a substantially uniform coating over the desired area was obtained. The liquid coated substrate samples were then exposed to a temperature of 163° C. (unless otherwise noted below) in an air circulating oven and periodically observed until all detectable tack had disappeared, or other indications of unsuitabilty, such as the apparent loss of most or all of the coating, had occurred. In some but not all instances, the liquid coated substrates were first exposed for a time from a few minutes to about two hours to

TABLE 1

COATING COMPOSITIONS TESTED

| Comp. | Tacky Solid | | Primary Stab. | | Additional Stab. | | Solvent | |
|---|---|---|---|---|---|---|---|---|
| # | # | Parts of | # | Parts of | # | Parts of | # | Parts of |
| 1  | 1 | 30   | —  | None   | —  | None   | 1  | 70    |
| 2  | 1 | 30   | 2  | 0.3    | —  | None   | 1  | 70    |
| 3  | 1 | 30   | 3  | 0.3    | —  | None   | 1* | 70    |
| 4  | 1 | 30   | 1  | 0.3    | —  | None   | 1* | 70    |
| 5  | 1 | 28.4 | 1  | 0.57   | —  | None   | 1* | 71.6* |
| 6  | 1 | 28.4 | 1  | 0.28   | 4  | 0.14   | 1* | 71.6* |
| 7  | 1 | 28.4 | 1  | 0.28   | 5  | 0.14   | 1* | 71.6* |
| 8  | 1 | 28.4 | 1  | 0.28   | 6  | 0.14   | 1* | 71.6* |
| 9  | 1 | 28.4 | 1  | 0.28   | 4  | 0.14   | 1* | 71.6* |
|    |   |      |    |        | 6  | 0.14   |    |       |
| 10 | 1 | 28.4 | 1  | 0.28   | 5  | 0.14   | 1* | 71.6* |
|    |   |      |    |        | 6  | 0.14   |    |       |
| 11 | 1 | 31.9 | 1  | 0.32   | 4  | 0.16   | 1* | 68.1* |
| 12 | 1 | 2.55 | 1  | 0.025  | 4  | 0.013  | 1* | 5.45* |
| 13 | 1 | 2.55 | 1  | 0.130  | 4  | 0.065  | 1* | 5.45* |
| 14 | 1 | 16.2 | 1  | 0.2    | 4  | 0.2    | 2  | 32.5  |
| 15 | 1 | 11.9 | 1  | 0.7    | 4  | 0.7    | 2  | 33.8  |
| 16 | 1 | 17.1 | 1  | 0.2    | 4  | 0.2    | 2  | 32.4  |
| 17 | 1 | 16.7 | 1  | 0.2    | 4  | 0.2    | 1  | 30.4  |
| 18 | 1 | 140  | 1  | 4      | 4  | 2      | 1  | 327   |
| 19 | 1 | 50   | 1  | 0.0625 | 4  | 0.0625 | 1  | 47.5  |
| 20 | 1 | 25   | 1  | 0.33   | 4  | 0.33   | 1  | 23.8  |
| 21 | 2 | 40   | 1  | 0.48   | 4  | 0.48   | 1  | 60    |
| 22 | 1 | 24   | 1  | 0.30   | 4  | 0.30   | 1  | 117   |
|    | 3 | 6    |    |        |    |        |    |       |
| 23 | 4 | 10   | 1  | 0.1    | 4  | 0.1    | 1  | 130   |

Footnote for Table 1
*Relatively small amounts, compared to the solvent shown, of acetone were used to predissolve the stabilizers and formed part of the total solvent in the formulation as coated for formulations on lines in which this footnote symbol appears.
Abbreviations for Table 1
Comp. = Composition;
# = Number;
Stab. = Stabilizer(s)

a temperature of 110° C. in order to drive out most of the solvent before beginning the high temperature aging tests. Results of the aging tests are shown in Table 2 below.

TABLE 2

AGING TEST CONDITIONS AND RESULTS

| Aging Test # | Sub-strate # | Ct. Comp. # | Stability Indicator(s) |
|---|---|---|---|
| 1A | 1 | 1 | 1.2% of ct. wt. rtd. and dkd. after 64 hrs; dk. brown af. 14 days |
| 1A' | 1 | 1 | 21% of ct. wt. rtd. af. 21 hrs, <2% af. 50 hrs[1] |
| 1S | 2 | 1 | Dkd. after 64 hours[1] |
| 2A | 1 | 2 | 1.4% of ct. wt. rtd. and dkd. after 64 hrs; dk. brown af. 14 days |
| 2A' | 1 | 2 | 24% of ct. wt. rtd. af. 21 hrs, <2% af. 50 hrs[1] |
| 2S | 2 | 2 | Dkd. after 64 hours[1] |
| 3A | 1 | 3 | 36% of ct. wt. rtd. and 51 dkd. after 64 hours[1] |
| 3A' | 1 | 3 | 37% of ct. wt. rtd. after 21 hrs, 33% af. 50 hrs.[1] |
| 3S | 2 | 3 | Dkd. after 64 hours |
| 4A | 1 | 4 | 33 % of ct. wt. rtd. and udkd. after 64 hrs; same % rtd., v.s. yeld. af. 14 days; |
| 4A' | 1 | 4 | 34% of ct. wt. rtd. and udkd. after 21 hrs. |
| 4S | 2 | 4 | Dkd. after 64 hours; dk. brown af. 14 days |
| 5A | 1 | 5 | Udkd. af. 24 hrs[2]; sl. yeld. af. 48 hrs; sl. m. yel. af. 5 days. |
| 5S | 2 | 5 | Tack rtd. af. 24 hrs[2]; 51 less tack af. 48 hrs; no tack af. 5 days. |
| 6A | 1 | 6 | Udkd. af. 24 hrs[2]; still udkd. af. 5 days |
| 6S | 2 | 6 | Tack rtd. af. 24 hrs[2]; uchgd. af. 48 hrs; no tack af. 5 days. |
| 7A | 1 | 7 | Udkd. af. 24 hrs[2]; still udkd. af. 5 days |
| 7S | 2 | 7 | Tack rtd. af. 24 hrs[2]; uchgd. af. 48 hrs; no tack af. 5 days. |
| 8A | 1 | 8 | Udkd. af. 24 hrs[2]; sl. dkd. af. 5 days |
| 8S | 2 | 8 | Tack rtd. af. 24 hrs[2]; uchgd. af. 48 hrs; no tack af. 5 days. |
| 9A | 1 | 9 | Udkd. af. 24 hrs[2]; still udkd. af. 5 days |
| 9S | 2 | 9 | Tack rtd. af. 24 hrs[2]; uchgd. af. 48 hrs; no tack af. 5 days. |
| 10A | 1 | 10 | Udkd. af. 24 hrs[2]; still udkd. af. 5 days |
| 10S | 2 | 10 | Tack rtd. af. 24 hrs[2]; uchgd. af. 48 hrs; no tack af. 5 days. |
| 11A | 4 | 11 | Still tack after 7 days[2] |
| 11S | 2 | 11 | No tack after 7 days[2] |
| 11C | 5 | 11 | Some tack lost af. 48 hrs; all tack lost af. 6 days |
| 11T | 6 | 11 | All tack rtd. af. 48 hrs; all tack lost af. 6 days |
| 11G | 7 | 11 | All tack rtd. af. 48 hrs; all tack lost af. 6 days |
| 11H | 8 | 11 | All tack rtd. af. 48 hrs; all tack lost af. 6 days |
| 12SS | 9 | 12 | All tack lost and si. yeld. after 7 days. |
| 12SG | 10 | 12 | Dkd. but still rtd. original tack after 7 days |
| 13 | 2 | 13 | No tack after 7 days. |
| 14AS | 3 | 14 | Sl. dkd. but still tacky af. 14 days; no tack af. 15 days |
| 14S | 2 | 14 | Sl. dkd. but still tacky af. 14 days; no tack af. 15 days |
| 15A | 3 | 15 | Coating in place af. 1 day except on upper part of substrate |
| 15S | 2 | 15 | No coating after 1 day. |
| 16A | 3 | 16 | Rtd. tack for 14 days; no tack after 15 days |
| 16S | 2. | 16 | Rtd. tack for 8 days; no tack after 9 days |
| 17A | 3 | 17 | Rd. tack for 19 days; no tack after 20 days |
| 17S | 2 | 17 | No tack after 5 days |
| 18A | 4 | 18 | Rtd. full tack for 15 days[3], some tack for 18 days; no tack after 19 days |
| 18PCS | 11 | 18 | Rtd. tack after 7 days[3]; no tack after 10 days |
| 18S | 2 | 18 | Rtd. tack after 4 days[3]; no tack after 7 days |
| 19A | 3 | 19 | Sl. tack rtd. after 1 day; no tack after 2 days |
| 19S | 2 | 19 | No coating rtd. after 1 day |
| 20A | 3 | 20 | Not dkd. and rtd. tack after 6 days;.rtd. most tack after 8 days, with sl. coating loss |
| 20S | 2 | 20 | Rtd. coating and some tack after 1 day; no tack after 2 days |

TABLE 2-continued

AGING TEST CONDITIONS AND RESULTS

| Aging Test # | Sub-strate # | Ct. Comp. # | Stability Indicator(s) |
|---|---|---|---|
| 21 | 3 | 21 | Retained tack after 14 days |
| 22 | 3 | 22 | Retained tack after 19 days |
| 23 | 3 | 23 | Retained tack after 84 days; test then discontinued |

Footnotes for Table 2
[1]Very little if any further change observed on further aging for 10 days. These tests, because they were performed in pans, were with considerably thicker films than those tested on panels, which are considered more practical. Also, tack was not measured in any of these tests.
[2]In these tests, the wet coated substrates were heated for one hour at 110° C. before beginning aging at higher temperature.
[3]Aging at 176° C.
General Note for Table 2
The symbol ' after an aging test number means that the aging was at 149° C.
Additional Abbreviations for Table 2
Ct. Comp. = Coating Composition;
ct. wt. = coating weight;
rtd. = retained;
dkd. = darkened;
hrs = hours;
dk. = dark;
af. = after;
sl. = slight(ly);
udkd. = undarkened;
yeld. = yellowed;
uchgd. = unchanged.

The invention claimed is:

1. A liquid coating composition which comprises each of the following components (A)–(D):
   (A) an amount of a component of polymeric material that (i) is solid and (ii) has tack sufficient to be sensed by a brief touch by a normal human finger, both throughout a temperature range from 25 to 160° C.;
   (B) an amount of a component of first stabilizing molecules and moieties thereof, exclusive of molecules and moieties thereof that constitute component (A), each of the first stabilizing component molecules or moieties thereof containing (i) at least one benzene ring that is substituted with at least one hydroxyl moiety and at least two alkyl moieties and (ii) at least one carbon atom bonded by single bonds to four other carbon atoms, alternatively called a "tertiary" carbon atom;
   (C) an amount of a component of second stabilizing molecules or moieties thereof, exclusive of molecules or moieties thereof that constitute component (A) or (B), each of the second stabilizing component molecules or moieties thereof containing (i) at least one divalent sulfur atom that is bonded to two distinct carbon atoms and (ii) at least two carboxyl or carboxylate moieties; and
   (D) an amount of a component of solvent, exclusive of materials that constitute part of any of the preceding components, the solvent having a freezing point below 20° C. and a boiling range at a pressure of 1 bar that begins at a temperature that is at least about 70° C. and ends at a temperature that is not more than 230° C. and being present in sufficient amount to dissolve together into a single solution all of components (A), (B), and (C) to form a solution that is liquid at 25° C.,
   said liquid coating composition having the property that, when a volume of the composition is formed into a layer not more than 0.5 millimeter in thickness and heated to at least one temperature not greater than 160° C., in a space containing gas having a pressure no higher than that of the ambient natural atmosphere, at least components (A), (B), and (C) of the composition will be converted within a time of 60 minutes into a coherent tacky solid, and at least a preponderant part of component (D) will be volatilized.

2. A liquid coating composition according to claim 1, wherein: the amount of component (C) has a ratio to the amount of component (B) that is from about 0.10:1.0 to about 2.0:1.0; the amount of component (B) has a ratio to the amount of component (A) that is from about 0.0010:1.0 to about 0.08:1.0; and component (D) has a boiling range between about 100 and about 220° C. at a pressure of 1 bar.

3. A liquid coating composition according to claim 2, wherein: the amount of component (C) has a ratio to the amount of component (B) that is from about 0.90:1.0 to about 1.10:1.0; the amount of component (B) has a ratio to the amount of component (A) that is from about 0.0090:1.0 to about 0.0013:1.0; component (D) has a boiling range between about 150 and about 180° C.; component (A) is selected from the group consisting of aliphatic hydrocarbon polymer molecules in which carbon atoms and carbon-carbon double bonds are present in respective numbers such that the number of carbon-carbon double bonds is not greater than about 0.3 times the number of carbon atoms; component (A) has a Viscosity Average molecular weight that is not less than about $1.0 \times 10^4$ and is not greater than about $1.1 \times 10^6$; component (B) is selected from the group consisting of molecules in which all benzene rings present are substituted with at least one hydroxyl moiety and at least two alkyl moieties, each of said alkyl moieties being bonded to said benzene ring via a carbon atom that is also bonded by single bonds to at least two other carbon atoms within the alkyl moiety, one of said alkyl moieties being a substituent on each of both carbon atoms in the benzene ring that are adjacent to each carbon atom in the benzene ring bearing a hydroxyl moiety substituent, and each of said alkyl moieties having from 2 to 8 carbon atoms; each molecule or moiety thereof that constitutes part of component (B) also contains at least one carboxylate ester moiety through which at least one benzene ring of the molecule or moiety thereof, said benzene ring having a hydroxyl substituent and at least two alkyl substituents, is bonded to a tertiary carbon atom in said molecule or moiety thereof, said carboxylate ester moieties and said benzene rings being present in component (B) in respective numbers such that the number of said carboxylate ester moieties is not less than the number of said benzene rings; component (C) is selected from the group consisting of molecules containing a number of carboxyl and carboxylate moieties, each of which is bonded via at least one of a total number of divalent alkylene moieties present in component (C) to one of a total number of divalent sulfur atoms present in component (C), each of said divalent alkylene moieties being also bonded to a carboxylate ester of an alcohol having from 6 to 22 carbon atoms per molecule, the total number of said divalent alkylene moieties present in component (C) being at least as great as the total number of divalent sulfur atoms present in component (C).

4. A liquid coating composition according to claim 3, wherein: component (A) is selected from the group consisting of homopolymers of isobutylene and copolymers of isobutylene and 1,3-butadiene in which carbon atoms and carbon-carbon double bonds are present in respective numbers such that the number of carbon-carbon double bonds is not greater than about 0.003 times the number of carbon atoms; component (A) has a Viscosity Average molecular weight that is not less than about $5.0 \times 10^4$ and is not greater than about $1.1 \times 10^6$; component (B) is tetrakis {methylene 3-(3',5'-ditertiarybutyl-4-hydroxybenzene propionate} methane; component (C) is lauryl stearyl thiodipropionate; component (D) is selected from petroleum mineral spirits and has a boiling range from 150 to 180° C.; and the solution of components (A), (B), and (C) in component (D) is not dispersed in any other liquid.

5. A process for forming a surfacing material suitable for the interior of baking ovens, said process comprising steps of:
(I) providing (i) a metallic substrate having at least one surface constituted of not less than 90% of aluminum and (ii) a liquid composition according to claim 4;
(II) forming at least part of the liquid composition provided in step (I) into a liquid coating with a thickness that is from about 300 to about 500 μm over at least part of the surface constituted of not less than 90% of aluminum on the substrate also provided in step (I); and
(III) heating, at a temperature that is not more than 170° C. and not less than a value obtained by subtracting 10° C. from the upper limit of the boiling range, at a pressure of 1 bar, of component (D) of the liquid composition provided in step (I), the liquid coating formed in step (II), while said coating is in place over the substrate surface as formed in step (II) and the liquid coating is in contact with the normal ambient atmosphere to convert the liquid coating to a solid, adherent, and tacky coating over those portions of the substrate surface that were provided with a liquid coating in step (II).

6. A baking oven comprising interior surfacing material made by a process according to claim 5.

7. A process according to claim 5, wherein the metallic substrate provided in step (I) is at least part of an interior surface within a heatable zone of a baking oven.

8. A baking oven modified by a process according to claim 7.

9. A process for cleaning a baking oven according to claim 8 that bears accumulated deposits of foreign material on at least part of its interior surface that is constituted of a coating formed according to said claim, said process comprising a step of heating said coating and the accumulated deposits thereon in ambient natural atmosphere to a temperature at which the metallic substrate on which said coating is formed remains solid but said coating decomposes.

10. A process for forming a surfacing material suitable for the interior of baking ovens, said process comprising steps of:
(I) providing (i) a metallic substrate having at least one surface constituted of not less than 60% of aluminum and (ii) a liquid composition according to claim 3;
(II) forming at least part of the liquid composition provided in step (I) into a liquid coating with a thickness that is from about 30 to about 1000 μm over at least part of the surface constituted of not less than 60% of aluminum on the substrate also provided in step (I); and
(III) heating, at a temperature that is not more than 200° C., the liquid coating formed in step (II), while said coating is in place over the substrate surface as formed in step (II) and the liquid coating is in contact with the normal ambient atmosphere, to convert the liquid coating to a solid, adherent, and tacky coating over those portions of the substrate surface that were provided with a liquid coating in step (II).

11. A baking oven comprising interior surfacing material made by a process according to claim 10.

12. A process according to claim 10, wherein the metallic substrate provided in step (I) is at least part of an interior surface within a heatable zone of a baking oven.

13. A baking oven modified by a process according to claim 12.

14. A process for cleaning a baking oven according to claim 13 that bears accumulated deposits of foreign material on at least part of its interior surface that is constituted of a coating formed according to said claim, said process comprising a step of heating said coating and the accumulated deposits thereon in ambient natural atmosphere to a temperature at which the metallic substrate on which said coating is formed remains solid but said coating decomposes.

15. A process for forming a surfacing material suitable for the interior of baking ovens, said process comprising steps of:
(I) providing (i) a metallic substrate having at least one surface constituted of not less than 60% of aluminum and (ii) a liquid composition according to claim 2;
(II) forming at least part of the liquid composition provided in step (I) into a liquid coating with a thickness that is from about 30 to about 1000 μm over at least part of the surface constituted of not less than 60% of aluminum on the substrate also provided in step (I); and
(III) heating, at a temperature that is not more than 200° C., the liquid coating formed in step (II), while said coating is in place over the substrate surface as formed in step (II) and the liquid coating is in contact with the normal ambient atmosphere, to convert the liquid coating to a solid, adherent, and tacky coating over those portions of the substrate surface that were provided with a liquid coating in step (II).

16. A baking oven comprising interior surfacing material made by a process according to claim 15.

17. A process according to claim 15, wherein the metallic substrate provided in step (I) is at least part of an interior surface within a heatable zone of a baking oven.

18. A baking oven modified by a process according to claim 17.

19. A process for cleaning a baking oven according to claim 18 that bears accumulated deposits of foreign material on at least part of its interior surface that is constituted of a coating formed according to said claim, said process comprising a step of heating said coating and the accumulated deposits thereon in ambient natural atmosphere to a temperature at which the metallic substrate on which said coating is formed remains solid but said coating decomposes.

20. A process for forming a surfacing material suitable for the interior of baking ovens, said process comprising steps of:

(I) providing (i) a metallic substrate having at least one surface constituted of not less than 45% of aluminum and (ii) a liquid composition according to claim 1;

(II) forming at least part of the liquid composition provided in step (I) into a liquid coating over at least part of the surface constituted of not less than 45% of aluminum on the substrate also provided in step (I); and (III) heating the liquid coating formed in step (II), while said coating is in place over the substrate surface as formed in step (II), to convert the liquid coating to a solid, adherent, and tacky coating over those portions of the substrate surface that were provided with a liquid coating in step (II).

* * * * *

UNITED STATES PATENT AND TRADEMARK OFFICE
CERTIFICATE OF CORRECTION

PATENT NO. : 6,191,201 B1
DATED : February 20, 2001
INVENTOR(S) : Jarema et al.

It is certified that error appears in the above-identified patent and that said Letters Patent is hereby corrected as shown below:

<u>Title page,</u>
Item [87], after "PCT Pub. Date: Apr. 24, 1997", insert the following:
-- Related U.S. Application Data
[60] Provisional application No. 60/005,714, filed on October 20, 1995. --
Item [57], ABSTRACT,
Line 4, after "C.", insert -- , --.

Signed and Sealed this

Tenth Day of February, 2004

JON W. DUDAS
*Acting Director of the United States Patent and Trademark Office*